United States Patent [19]

Davis et al.

[11] Patent Number: 5,287,530
[45] Date of Patent: Feb. 15, 1994

[54] MULTICAST SERVER APPARATUS

[75] Inventors: Simon P. Davis, Romsey; Ian B. Stewart, North Baddesley, both of Great Britain

[73] Assignee: Roke Manor Research Limited, Romsey, Great Britain

[21] Appl. No.: 862,662

[22] Filed: Apr. 2, 1992

[30] Foreign Application Priority Data

Apr. 16, 1991 [GB] United Kingdom ............... 9108088

[51] Int. Cl.$^5$ .......................................... H04J 3/24
[52] U.S. Cl. ...................................... 370/94.1; 370/60
[58] Field of Search ............... 370/94.1, 60, 108, 60.1, 370/85.15, 58.3, 110.1, 58.1, 58.2

[56] References Cited

U.S. PATENT DOCUMENTS

| | | | |
|---|---|---|---|
| 5,119,370 | 6/1992 | Terry | 370/60.1 |
| 5,130,984 | 7/1992 | Cisneros | 370/60 |
| 5,144,619 | 9/1992 | Munter | 370/60.1 |

FOREIGN PATENT DOCUMENTS

| | | |
|---|---|---|
| 86/02510 | 4/1986 | PCT Int'l Appl. . |
| 8909521 | 6/1992 | PCT Int'l Appl. . |

OTHER PUBLICATIONS

S. Nojima et al., "Integrated Services Packet Network Using Bus Matrix Switch," IEEE Journal on Selected Areas in Communications, Oct. 8, 1987, vol. SAC-5, No. 8, pp. 1284-1292.
K. Eng et al., "Multicast and Broadcast Services in a Knockout Packet Switch", p. 31 left col., line 1-5 and line 28-right col., line 26, p. 33, left col., line 20-57.
P. Newman et al., "A Slotted Ring Copy Fabric for a Multicast Fast Packet Switch", Section 4.3, paragraph 3.
M. Nagasawa et al., "Packet Switching Network Access Protocols for Multi Media Packet Communications", FIG. 4.

*Primary Examiner*—Douglas W. Olms
*Assistant Examiner*—Shick Hom
*Attorney, Agent, or Firm*—Keck, Mahin & Cate

[57] ABSTRACT

A multicast server apparatus operative to effect the onward transmission of data cells to a plurality of different addresses includes a switch function unit having an input port, an output port and a transfer port, data cells for multicasting being routed from the input port and to the transfer port, first and second header translation units each having an input terminal and an output terminal. The translation units serve respectively as a chainer and as a distributor, the input terminals of the chainer and the distributor being coupled to the transfer port of the switch function unit to receive data for multicasting. The chainer is effective to change address data associated with each data cell fed thereto to a form recognizable by the distributor and to feed back such data cell together with its changed address data to the transfer port. The distributor is effective to convert recognizable address data associated with data cells fed thereto to corresponding route address tags and to feed cells having such address tags to the output port of the switch function unit. Thus, a data cell for multicasting is distributed by the multicasting server apparatus separately to the plurality of different addresses as identified by the address tags.

2 Claims, 3 Drawing Sheets

MULTICAST SERVER APPARATUS

BACKGROUND OF THE INVENTION

This invention relates to multicast server apparatus and more especially it relates to such apparatus for use in asynchronous transfer mode (ATM) switches.

ATM switches serve for the asynchronous transmission of digital data cells which include address data inter alia, in addition to a data packet pay load.

Multicast server apparatus which is sometimes described as point to multipoint apparatus, is used to route a data packet pay load to a plurality of different addresses.

Many data transmission network services require a multicast server capability and such services include video conferencing, video lecture calls, distributed databases and broadcast signalling at a user network interface. In order to meet these requirements a switching network must be capable of providing a multicast capability at the ATM level,

SUMMARY OF THE INVENTION

According invention multicast server apparatus operative to effect the onward transmission of data cells to a plurality of different addresses, comprises a switch function unit having an input port, an output port and a transfer port, data cells for multicasting being routed from the input port to the transfer port, first and second header translation units each having an input terminal and an output terminal, which translation units serve respectively as a chainer and as a distributor, the input terminals of the chainer and the distributor respectively being coupled to the transfer port of the switch function unit to receive data for multicasting, the chainer being effective to change address data associated with each data cell fed thereto to a form recognisable by the distributor and to feed back such data cell together with its changed address data to the said transfer port, and the distributor being effective to convert recognisable address data associated with data cells fed thereto to corresponding route address tags and to feed cells having such address tags to the output port of the switch function unit, whereby a data cell for multicasting is distributed by the multicasting server apparatus separately to the said plurality of different addresses as identified by the said tags.

Thus it will be appreciated that initially, a data cell for multicasting will be identified from its address by the chainer only although it is fed also to the distributor. The chainer then operates in feedback mode to produce a sequence of addresses having a form recognisable by the distributor the sequence being continued until the chainer produces a final terminating address which is not recognised when fed back. The distributor operates contemporaneously to produce an address tag for each address of the sequence and routes the data cell together with each address tag to the output port of the switch function unit.

BRIEF DESCRIPTION OF THE DRAWINGS

One embodiment of the invention will now be described by way of example with reference to the accompanying drawings, in which.

DETAILED DESCRIPTION OF THE DRAWINGS

Figure 1:
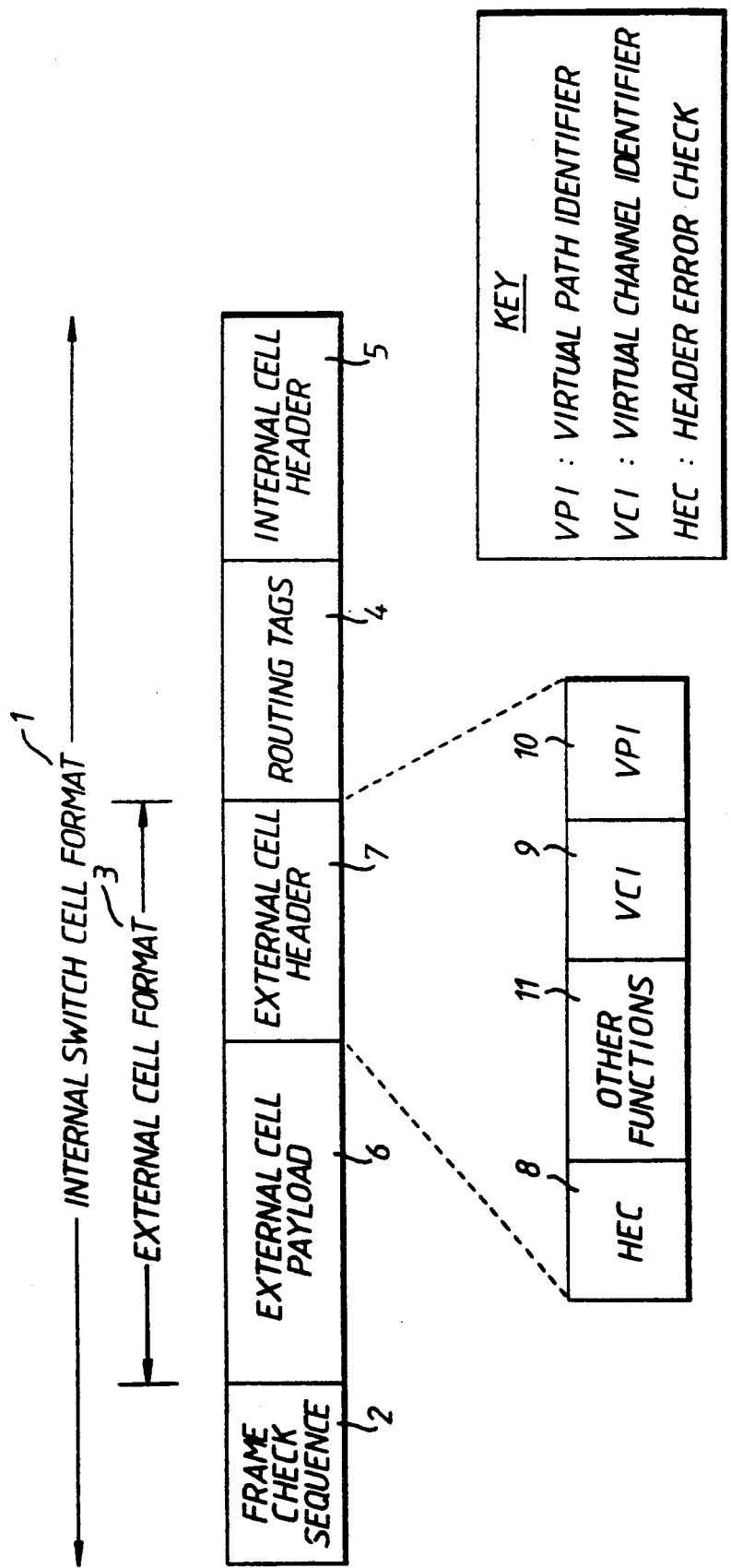
FIG. 1 is a generally schematic block diagram showing a generalised internal switch cell format.

Referring now to FIG. 1 an internal switch cell format 1 comprises frame check sequence 2, an external cell format 3, routing tags 4 and an internal cell header 5. The frame check sequence (FCS) serves an error detection function which is applied to the internal switch cell format 1 as a whole. The external cell format 3 comprises an external cell data pay load 6 and an external cell header 7. The external cell header 7 includes header error check data (HEC) 8 which is used to facilitate error detection/correction of data which comprises the external cell header 7. The external cell header 7 additionally comprises virtual channel identifier data (VCI) 9 and virtual path identifier data (VPI) 10. The VCI 9, and VPI 10, in combination serve to indicate the address or addresses to which the external cell data pay load should be routed. Other functions 11 are also included within the external cell header 7 which do not relate to the present invention and which accordingly will not be described herein.

The routing tags 4 are included to enable a cell to be routed through a switch function unit in accordance with the address data as defined by the VCI 9 and the VPI 10. The internal cell header 5 is used to maintain sync and for general housekeeping functions which are well known to those skilled in the art.

The generalised internal switch cell format just before described with reference to FIG. 1 is well known and used by many ATM switch systems.

Figure 3:
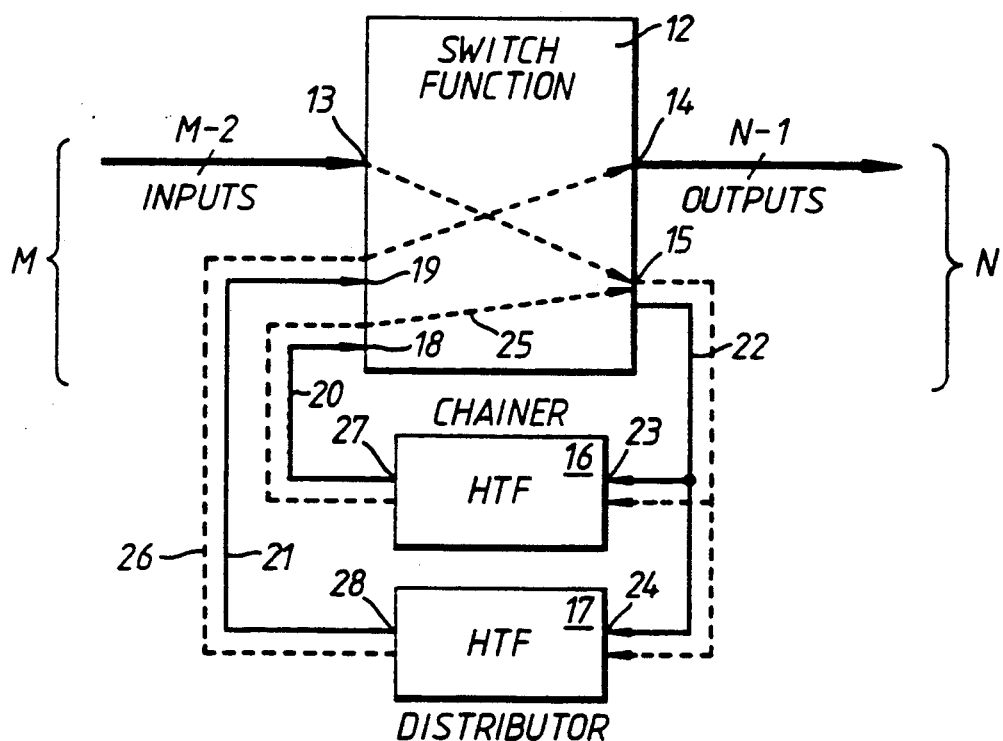

In order to provide a multicast server capability a multicast server unit as shown in FIG. 3 is provided which comprises an M input and N output switch function unit 12 having M-2, input ports 13, and N-1 output ports 14 and a transfer port 15. When a data cell is received at one of the input ports 13 characterised by an address as indicated by the VCI 9 and VPI 10 as being a cell which should be routed to a plurality of different addresses, routing tags 4 are set within the switch function unit 12 such that the cell is routed to the transfer port 15. The transfer port 15 is coupled to two header translation function units 16 and 17 which are arranged to feed input terminals 18 and 19 respectively of the switch function unit 12 via lines 20 and 21 respectively.

The header translation function unit 16 serves the function of a chainer and the header translation function unit 17 serves the function of a distributor, thus the units 16 and 17 will hereinafter be described as the chainer 16 and the distributor 17.

Thus initially a data cell for multicasting which has been routed from one of the input ports 13 of the switch function unit 12 to the transfer port 15 of the switch function unit 12 is fed via a line 22 to an input terminal 23 of the chainer 16 and contemporaneously to an input terminal 24 of the distributor 17. The data cell for multicasting will initially be identified from its address by the chainer 16 only although it is fed also to the distributor 17. The chainer 16 operates to modify the address as indicated by the VPI/VCI, the data cell together with its modified address being fed back as indicated by the broken line 25 to the transfer port 15 where it is re-presented both to the chainer 16 and to the distributor 17.

The chainer 16 then operates to produce a new modified address and the distributor recognises the modified address and changes the routing tag and the VCI/VPI address so that the data cell is fed via the broken line 26 and the input terminal 19 to one of the output ports 14 of the switch function unit 12. The chainer 16 then operates in feed-back mode to produce a sequence of addresses having a form recognisable by the distributor 17, the sequence being continued until the chainer 16 produces a final terminating address which is not recognised when fed back. The distributor 17 operates contemporaneously to produce an address tag and to translate the VPI/VCI for each address of the sequence and routes the data cell together with each address tag to an appropriate one of the output ports 14 of the switch function unit 12.

The switch function unit 12 operates in a well known manner for the purpose of routing data cells in accordance with the routing tags associated therewith and accordingly detailed description of the switch function unit 12 will not be included herein.

Figure 2:
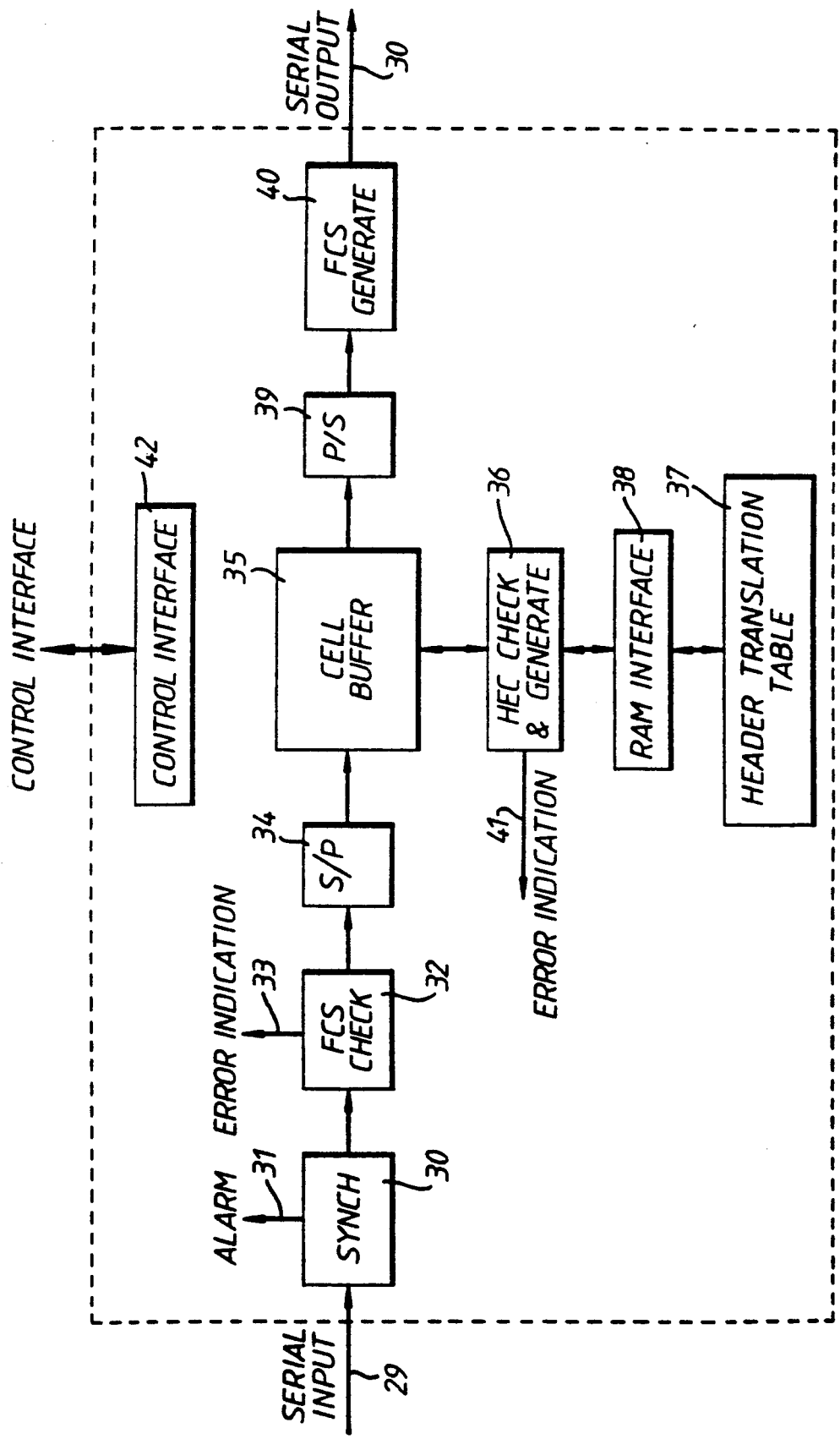
FIG. 2 is a generally schematic block diagram of a header translation unit and FIG. 3 is a generally schematic block diagram of a multicast server which utilises two header translation units each as shown in FIG. 2.

Referring now to FIG. 2, the header translation function units which define the chainer 16 and the distributor 17 will now be described. The header translation function unit shown in FIG. 2 comprises an input terminal 29 which corresponds to the terminals 23 and 24 as shown in FIG. 2 of the chainer 16 and distributor 17 respectively and an output terminal 30 which corresponds to the output terminals 27 and 28 as shown in FIG. 2 of the chainer 16 and distributor 17 respectively. The input terminal 29 is arranged to feed a synchronisation unit 30 which serves to achieve cell synchronisation in order to determine the start and finish of each cell. In the absence of synchronisation an alarm indication is afforded on a line 3 1. The cell is then fed to frame check sum (FCS) unit 32 which performs a frame check sum in respect of the internal switch cell format, an error signal being provided on a line 33 if appropriate. The cell is then fed via a series/parallel conversion unit 34 to a cell buffer store 35. The external cell header as stored in the buffer store 35 is then checked by a header error check (HEC) unit 36. The address data in the case of a chainer or routing tags in the case of a distributor are compared with data in a RAM 37 which serves the function of a header translation table which is addressed via an interface unit 38. If the header translation function unit is operating as a chainer the VCI/VPI which defines the address is then appropriately modified and the cell with the modified address is fed to a parallel/series conversion unit 39.

If on the other hand the header translation function unit is operating as a distributor the routing tag and the VCI/VPI data is appropriately modified and the cell together with new routing tags is fed to the parallel/series conversion unit 39. New frame check sum data is added to the data cell by a frame check sum generator 40 and the data cell is then fed to the output terminal 30. General operation of the header translation function unit is controlled via a control interface 42 which responds appropriately in the presence of error indication signals from the HEC unit 36 on the line 41, or error or alarm signals on the lines 33 or 31 respectively.

It will be appreciated that the header translation function unit as just before described with reference to FIG. 2 may contain a header translation table including a RAM which is appropriate to perform the function either of a chainer which modifies the address as indicated by the VPI/VCI or alternatively it may contain data for modifying routing tags and perform the function of a distributor.

It will also be appreciated that multicast server units as shown in FIG. 2 may be operated in series and/or parallel to provide a fan out function. Various modifications may be made to the multicast server unit just before described without departing from the scope of the invention and for example any suitable type of switch function unit or header translation function unit as well known to those skilled of the art may be used in a configuration as shown in FIG. 2 to afford a multicast server function.

We claim:

1. Multicast server apparatus operative to effect the onward transmission of data cells to a plurality of different addresses, comprising a switch function unit having an input port, an output port and a transfer port, data cells for multicasting being routed from the input port to the transfer port, first and second header translation units each having an input terminal and an output terminal, which translation units serve respectively as a chainer and as a distributor, the input terminals of the chainer and the distributor respectively being coupled to the transfer port of the switch function unit to receive data for multicasting, the chainer being effective to change address data associated with each data cell fed thereto to a form recognizable by the distributor and to feed back such data cell together with its changed address data to the said transfer port, and the distributor being effective to convert recognizable address data associated with data cells fed thereto to corresponding route address tags and to feed cells having such address tags to the output port of the switch function unit, whereby a data cell for multicasting is distributed by the multicasting server apparatus separately to the said plurality of different addresses as identified by the said address tags.

2. Multicast server apparatus as claimed in claim 1 wherein each header translation unit comprises a RAM such that data in the RAM of a unit which serves as a chainer facilitates address data modification and such that data in the RAM of a unit which serves as a distributor facilitates routing tag conversion.

* * * * *